May 26, 1959 T. L. FAWICK Re. 24,652

ASSEMBLY FOR USE AS A CLUTCH OR A BRAKE

Original Filed Feb. 17, 1954 3 Sheets-Sheet 1

ASSEMBLY FOR USE AS A CLUTCH OR A BRAKE

Original Filed Feb. 17, 1954 3 Sheets-Sheet 2

INVENTOR.
THOMAS L. FAWICK
BY Willard D. Eaton
ATTORNEY

ASSEMBLY FOR USE AS A CLUTCH OR A BRAKE

Original Filed Feb. 17, 1954 3 Sheets-Sheet 3

INVENTOR.
THOMAS L. FAWICK
BY
Willard D. Eakin
ATTORNEY

United States Patent Office

Re. 24,652
Reissued May 26, 1959

24,652

ASSEMBLY FOR USE AS A CLUTCH OR A BRAKE

Thomas L. Fawick, Cleveland, Ohio, assignor to Fawick Corporation, a corporation of Michigan Original No. 2,857,031, dated October 21, 1958, Serial No. 410,804, February 17, 1954. Application for reissue November 17, 1958, Serial No. 774,570

12 Claims. (Cl. 192—85)

Matter enclosed in heavy brackets [ ] appears in the original patent but forms no part of this reissue specification; matter printed in italics indicates the additions made by reissue.

This invention relates to torque sustaining clutches or brakes.

Its chief objects are dependability, durability, compactness, ease of assembly and disassembly, especially for quick and easy substitution of new wear-shoes, simplicity, and economy of construction.

Figure 2:
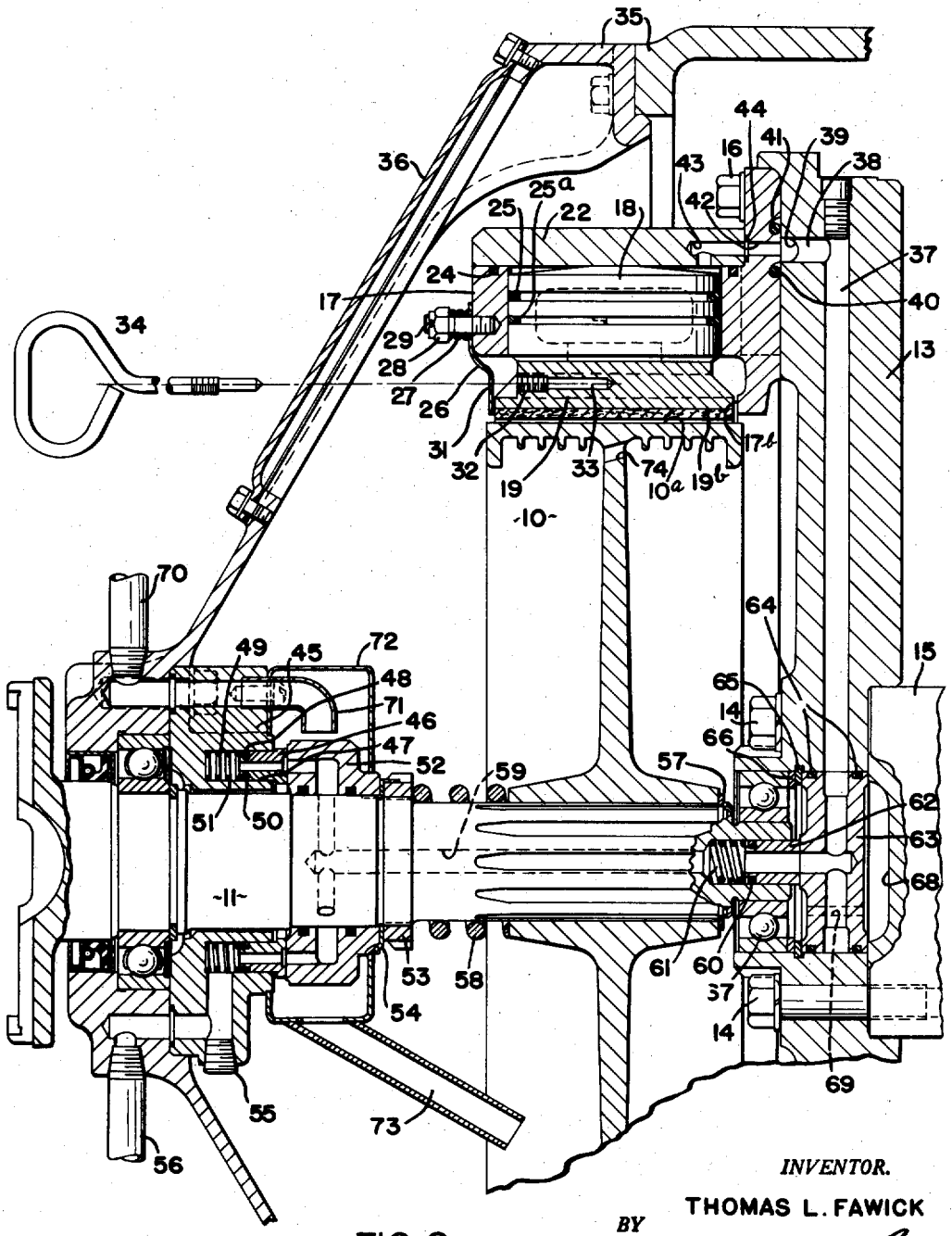
Fig. 2 is a section, on line 2—2 of Fig. 1, of the complete assembly.

The particular embodiment here shown is a clutch of the constricting type. The drum, 10, Fig. 2, is splined upon a shaft 11, and is formed with a frictional-engagement surface 10[a] which is gripped by a set of circumferentially spaced wear-shoes 19, 19. The mounting for the wear-shoes comprises a clutch element 13, which can be a fly-wheel, secured, as by bolts 14, 14, upon a shaft 15, which can be a crank-shaft. Secured to the outer margin of the element 13, as by bolts 16, 16, is an over-hang clutch ring 17 of complex shape, this ring being formed at circumferentially spaced positions with openings extending radially through the ring.

Figure 1:
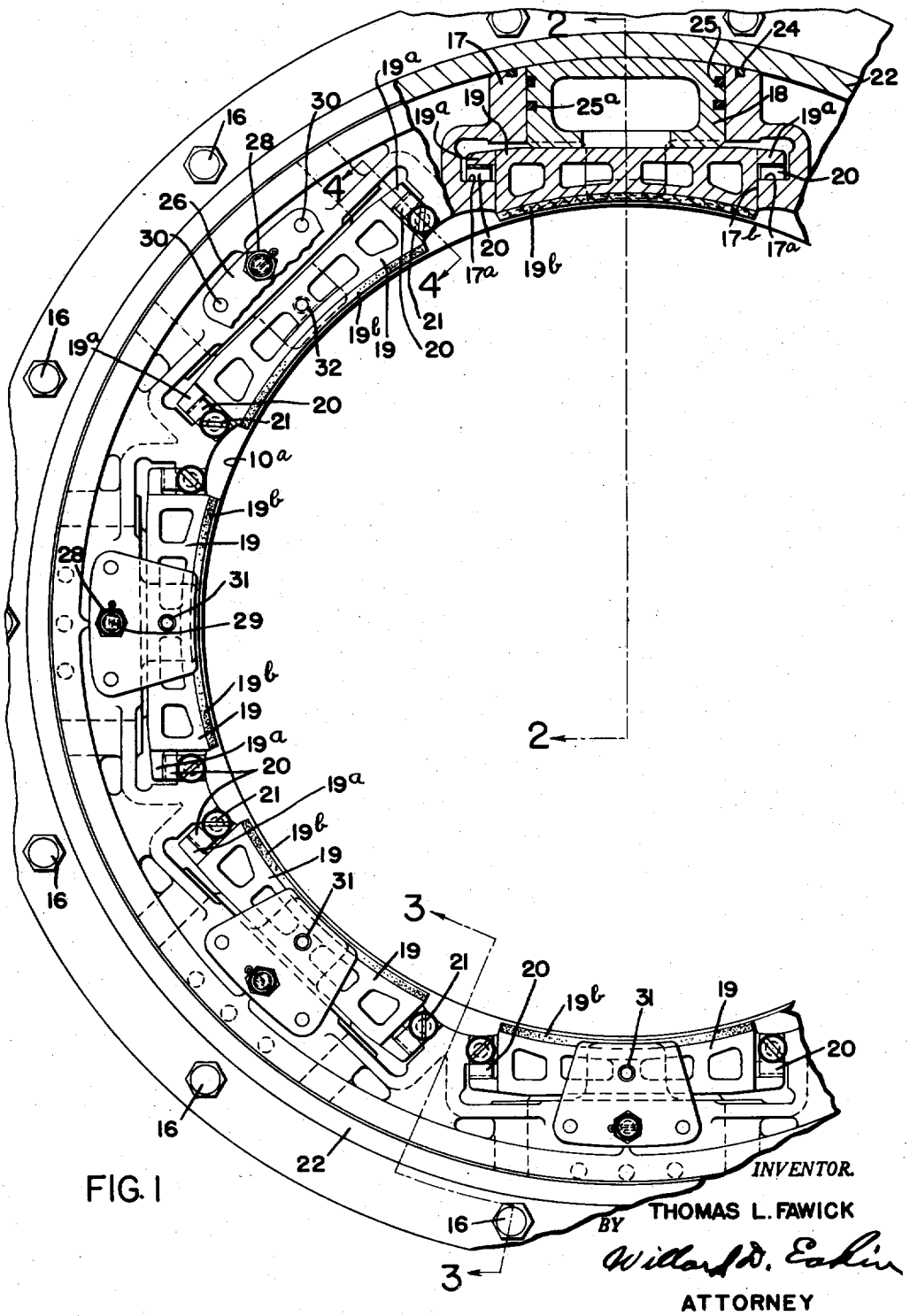
Fig. 1 is an elevation, with parts sectioned and broken away, of parts of an assembly embodying the invention in its preferred form.
Figure 4:
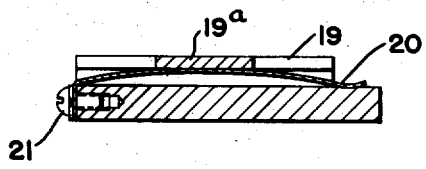
Fig. 4 is a section on line 4—4 of Fig. 1.

As shown clearly in Fig. 1, each of these openings has a radially outer part providing a cylinder for a piston 18 and a radially inner part providing a guideway 17[b] for a wear-shoe 19 and seats 17[a], 17[a] for a pair of springs 20, 20. The middle of each spring 20 bears against and constantly urges outward a projection 19[a] formed on the adjacent end of the base of the wear-shoe, Figs. 1 and 4. Each spring has an inwardly extending apertured end portion, Fig. 4, secured by a screw 21 to a face of the clutch ring for holding the spring in place when the wear-shoe is moved, axially of the assembly, into or out of its guideway.

Figure 3:
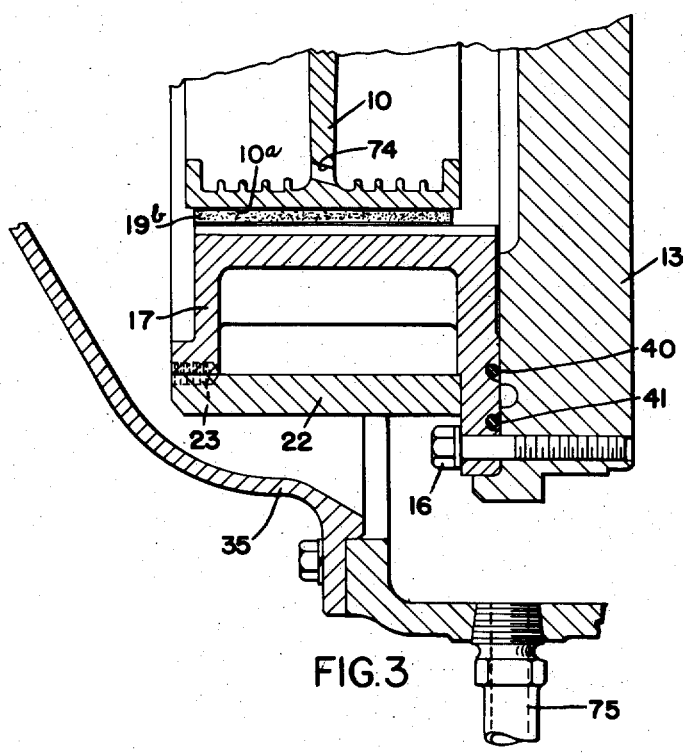
Fig. 3 is a section on the indirect line 3—3 of Fig. 1.

Cylinder-heads for all of the cylinders, at the outer ends, are provided by a cylindrical ring 22 that surrounds the set of cylinders and is held upon the clutch-ring 17 by means such as the screw 23, Fig. 3. Each cylinder is sealed to the ring 22, as its cylinder-head, by an O-ring 24 set in an annular groove in the radially outer face of the clutch-ring 17, and each piston has for its packing an O-ring 25 set in an annular groove formed in the piston, and, if desired, a second such ring, 25[a], likewise mounted. The invention of course does not exclude, however, the use of a standard metal piston ring instead of or in addition to the O-ring.

For lightness each shoe 19 is of webbed construction, as shown clearly in Fig. 1, and for coaction with the drum 10 is provided with an adhered friction facing 19[b].

For retaining each wear-shoe in its guideway while permitting it to move radially of the assembly for clutch engagement and disengagement, a retaining plate 26, Figs. 1 and 2, here shown as being formed with an off-set, Fig. 2, is urged against a side face of the clutch-ring 17, by a compression spring 27 interposed between the outer face of the retaining plate and a nut 28 threaded upon a screw stud 29 mounted in the ring 17 and extending through a hole in the retaining plate. Each of the retaining plates is formed with a pair of pressed-out detents 30, 30 seating in respective recesses formed in the ring 17, under the force of the spring 27, to prevent undesired rotation of the retaining plate about the stud 29. Each retaining plate is formed also with a hole 31 for engagement of the plate by a suitable tool for pulling it sufficiently to overcome the spring 27 and dislodge the detents 30 from their recesses so that the plate can be turned out of the way of a wear-shoe being removed from or moved into its guideway, axially of the assembly.

To facilitate such manipulation of the wear-shoes each is formed, on its face adjacent the retaining plate, with a threaded hole 32 having in extension thereof a guide hole 33 of smaller diameter, for engagement of the shoe by a tool 34, Fig. 2, having portions complemental to the holes 32, 33.

The clutch housing, 35, is formed with an access opening provided with a removable closure plate 36, Fig. 2, at a position to which the wear-shoe assemblies can be brought in succession for removal or insertion of wear shoes.

For conducting actuating fluid to and from the pistons the clutch element 13 is formed with a radial passage 37 and a passage 38 branching therefrom and leading into an annular groove 39 formed in the face of the member 13 adjacent the clutch-ring 17. Those two members are sealed to each other on each side of the annular groove 39 by a radially inward O-ring 40 and a radially outward O-ring 41 set in respective grooves in the clutch-ring 17.

At the position of each cylinder the annular groove 39 is in communication with the cylinder through one or more registered pairs of passages such as those shown at 42, 43, Fig. 2, in the members 17 and 22, with an interposed O-ring 44.

The actuating fluid is supplied to and vented from the passage 37 in the clutch element 13 through a rotary seal shown at the left of Fig. 2 and a second rotary seal shown at the right of Fig. 2.

The first mentioned rotary seal comprises a non-rotating ring 45 surrounding the shaft 11 and secured to the bearing housing of the shaft. In a deep annular groove formed in the axially inner face of the ring 45 are slidably mounted a radially outer slip-seal ring 46 and, spaced radially inward therefrom, a small-diameter slip-seal ring 47.

The outer slip-seal ring 46 is slidably sealed to the adjacent wall of the recess by an O-ring 48 and is backed by a spring 49. The inner slip-seal ring is slidably sealed to the adjacent wall of the recess by an O-ring 50 and is backed by a spring 51.

The rings 46 and 47 have slip-seal relation to a plane sealing face formed upon a fluid conducting ring 52 which is held against a shoulder on the shaft 11 by a nut 53 and lock-washer 54.

The annular space between the slip-seal rings 46, 47 is in communication, as shown clearly in Fig. 2, with alternatively usable inlet-outlet pipes 55, 56 for use alternatively of different clutch actuating fluids, such as oil and air.

The clutch-drum 10 is splined upon the shaft 11 and retained thereon by a snap-ring 57 and is held against the snap-ring by a spring 58 mounted between its hub and the nut 53.

Suitable passages as shown lead from the annular space between the slip-seal rings 46, 47 to an axial passage 59 in the shaft 11. The passage 59 leads to a recess of larger diameter formed in the right-hand end face of the shaft 11, in which recess is slidably sealed, by an O-ring 60, and backed by a spring 61, a tubular slip-seal member 62 having slip-seal relation to a fluid-conducting disc or plug member 63 mounted in a complemental socket formed in the clutch element 13 and having communication with the passage 37 of the member 13. The plug member 63 is sealed to the wall of its socket, on each side of the passage 37, by an O-ring 64, 64, and is retained in its socket by a snap-ring 65. A spacer ring 66 is mounted between the snap-ring 65 and the outer race of a pilot bearing 67 which journals the end of the shaft 11 in the clutch element 13.

At a position within the circle of the adjacent O-ring 64 the shaft 15 is formed with a recess 68 in its end face and the plug member 63 is formed with a vent hole 69 leading from said recess, so that any leakage past the O-ring can escape through the recess 68, passage 69 and the bearing 67. The building up of back pressure such as would prevent proper functioning of the self-energizing O-ring is thus prevented.

Provision for cooling the clutch (or brake) drum 10 comprises a cooling-liquid supply pipe 70 from which liquid is discharged through a spout 71 into a chamber defined by an annular stamping 72 which surrounds the member 52 and is substantially sealed to it and to the member 45, to which it is secured. At its lowest part the stamping 72 is provided with an outlet spout 73 which terminates at a position to discharge cooling liquid onto a low part of the inner face of the rim of the clutch-drum 10. The radial web of the drum is formed with a set of circumferentially spaced oblique holes 74, 74, Figs. 2 and 3, so that cooling fluid will flow to the other side of the web.

The bottom of the clutch housing 35 is provided with a drainage pipe 75, Fig. 3, leading to the intake side of a pump, not shown, for returning the cooling fluid to the inlet pipe 70.

Preferably a suitable oil is used as the cooling fluid, so that its circulation will provide lubrication for the slip-seal faces of the rotary seals and for the bearing 67. As it circulates independently of the actuating fluid it can be chosen for suitable cooling as well as lubricating characteristics.

The operation of the assembly will be manifest from the foregoing description.

An important feature of the invention is that each piston 18 and its cylinder provide a brake-actuating or clutch-actuating motor individual to the associated wear-shoe 19. While in normal service each motor applies the same amount of braking pressure to its shoe as the other motors do to their respective shoes, all being connected to the same source of pressure fluid, yet each motor can be readily serviced or repaired as an individual motor, and the motors are not all dependent upon continued functioning of a vulnerable annular diaphragm as in the case of some devices of the prior art.

I claim:

1. An assembly comprising two relatively rotatable structures adapted for frictional, torque-sustaining engagement with each other, one of said structures having a frictional-engagement surface and the other of said structures comprising an actuating unit for frictional engagement with said surface, said unit comprising a wear-shoe structure, rigid means fixed in position in relation to the axis and *circumferentially of* the orbit of the relative rotation of the said surface and integrally defining a pressure-fluid cylinder chamber and, in integral extension thereof, a guideway having torque-sustaining walls for guiding [and] *said* wear-shoe structure in its engaging and disengaging movements toward and from said frictional-engagement surface, a piston slidably mounted in said cylinder chamber for impelling said wear-shoe structure in its engaging movement, the said guideway-defining means integrally defining also a lateral passage for mounting and removal of the entire wear-shoe structure wholly by movement thereof in a direction at right-angles to the direction of its engaging movement, said piston bearing against but being unattached to the said wear-shoe structure, the bearing surfaces of said piston and said wear-shoe structure being continuous and unbroken, the cylinder chamber and piston being individual to the single wear-shoe structure, and the entire wear-shoe structure being insertable and removable through the said lateral passage without interference of any part of the means integrally defining the said cylinder chamber and the said guideway, with the piston remaining in the cylinder chamber.

[2. An assembly as defined in claim 1 and including a removable guideway wall for retaining the wear-shoe in its guideway and means pivotally mounting the removable guideway wall upon the means defining the guideway for turning said wall of the way of a wear-shoe being moved axially of the assembly into or out of the guideway.]

[3. An assembly as defined in claim 1 and including a removable guideway wall for retaining the wear-shoe in its guideway and in which the removable guideway wall is pivotally mounted for turning it out of the way of a wear-shoe being moved axially of the assembly into or out of its guideway, and including yielding means for urging said wall against the guide-way defining means as a stop for positioning said wall and preventing its undesired rotation.]

[4. An assembly as defined in claim 1 in which each wear-shoe is formed with means engageable by a tool for pulling the wear-shoe, axially of the assembly, from the guideway, the said pulling means comprising the wall of a threaded hole in the wear-shoe and in which the wear-shoe is formed with a tool-guiding hole in extension of but of smaller diameter than the recited threaded hole.]

[5. An assembly as defined in claim 1 in which the recited means defining the guideway is formed at each end of the wear-shoe space circumferentially of the assembly with an axially and circumferentially extending spring-seat shoulder, each wear-shoe is formed at each of its ends with a spring-seat projection overlying and spaced from the said spring-seat shoulder, and the recited yielding means comprises a spring interposed between each spring-seat shoulder and the adjacent spring-seat projection.]

[6. An assembly as defined in claim 5 in which each of the recited springs is of the leaf type and is secured at one of its ends to the guideway-defining means for retention of the spring in place when the wear-shoe is removed.]

[7. An assembly as defined in claim 1 and including a fluid-conducting shaft upon which the recited structure having the recited frictional-engagement surface is secured, a rotary seal surrounding the axis of said shaft for conducting actuating fluid into said shaft, and a second rotary seal surrounding the axis of said shaft for conducting actuating fluid through the other one of the recited structures to the recited cylinder chambers.]

8. An assembly comprising two relatively rotatable, fluid-conducting structures adapted for frictional, torque-sustaining engagement with each other and a rotary seal for conducting actuating fluid from one to the other of said structures, said rotary seal comprising a fluid-conducting slip-seal plug seated in a recess formed in and surrounding the axis of one of said structures and in communication in a radial direction with a fluid-conducting passage formed in that structure, and self-energizing sealing means, at each side of the said passage, axially of the assembly, said sealing means surrounding the said plug and sealing it to the walls of the said recess, and the one of the said structures that is formed with the said recess being formed also with a vent passage extending from the floor of the said recess for venting to a region of lower pressure any fluid that may leak past the adjacent one of the said self-energizing sealing means.

9. An assembly comprising two relatively rotatable structures adapted for frictional, torque-sustaining engagement with each other, one of said structures having a frictional-engagement surface and the other of said structures comprising unitarily rigid means defining a rigidly connected set of circumferentially spaced, radially disposed cylinder chambers, pistons slidably mounted in the said chambers respectively, and a ring formed separately from said means but constituting cylinder-head means common to said chambers, the said unitarily rigid means and the said ring being formed with a single pair of mating cylindrical faces, and said ring providing closures for all of the said cylinder chambers and the said ring being axially slidable from said unitarily rigid means.

10. An assembly as defined in claim 9 and including, for each cylinder chamber, a self energizing sealing ring sealing the chamber wall to the said ring.

*11. An assembly comprising two relatively rotatable structures adapted for frictional, torque-sustaining engagement with each other, one of said structures having a frictional-engagement surface and the other of said structures comprising an actuating unit for frictional engagement with said surface, said unit comprising a wear-shoe structure, rigid means fixed in position in relation to the axis and circumferentially of the orbit of the relative rotation of the said surface and defining both a pressure-fluid cylinder chamber and, in extension thereof, a guideway having torque-sustaining walls for guiding said wear-shoe structure in its engaging and disengaging movements toward and from said frictional-engagement surface, a piston slidably mounted in said cylinder chamber for impelling said wear-shoe structure in its engaging movement, the said guideway-defining means defining also a lateral passage for mounting and removal of the entire wear-shoe structure wholly by movement thereof in a direction transverse to the direction of its engaging movement, said piston bearing against but being unattached to the said wear-shoe structure, the bearing surfaces of said piston and said wear-shoe structure being relatively slidable into and out of overlapped relation to each other in such movement, the cylinder chamber and piston being individual to the single wear-shoe structure, and the entire wear-shoe structure being insertable and removable through the said lateral passage without interference of any part of the means defining the said cylinder chamber and the said guideway, with the piston remaining in the cylinder chamber.*

*12. An assembly comprising two relatively rotatable structures adapted for frictional, torque-sustaining engagement with each other, one of said structures having a frictional-engagement surface and the other of said structures comprising an actuating unit for frictional engagement with said surface, said unit comprising a wear-shoe structure, rigid means fixed in position in relation to the axis and circumferentially of the orbit of the relative rotation of the said surface and defining a guideway having torque-sustaining walls for guiding said wear-shoe structure in its engaging and disengaging movements toward and from said frictional engagement surface, means for impelling said wear-shoe structure in said guideway in its engaging movement, the said guideway-defining means defining also a lateral passage for mounting and removal of the entire wear-shoe structure wholly by movement thereof in a direction transverse to the direction of its engaging movement, said impelling means bearing against but being unattached to the said wear-shoe structure, the bearing surfaces of said impelling means and said wear-shoe structure being relatively slidable into and out of overlapped relation to each other in such movement, the guideway and the impelling means being individual to the single wear-shoe structure, and the entire wear-shoe structure being insertable and removable through the said lateral passage without interference of any part of the means defining the said guideway, with the said impelling means remaining in alignment with the said guideway.*

*13. An assembly as defined in claim 12 and including a removable guideway wall for retaining the wear-shoe in its guideway and means pivotally mounting the removable guideway wall upon the means defining the guideway for turning said wall out of the way of a wear-shoe being moved into or out of its guideway.*

*14. An assembly as defined in claim 12 and including a removable guideway wall for retaining the wear-shoe in its guideway and in which the removable guideway wall is pivotally mounted for turning it out of the way of a wear-shoe being moved into or out of its guideway, and including yielding means for urging said wall against the guideway-defining means as a stop, for positioning said wall and preventing its undesired rotation.*

*15. An assembly as defined in claim 12 in which each wear-shoe is formed with means engageable by a tool for pulling the wear-shoe from the guideway, the said pulling means comprising the wall of a threaded hole in the wear-shoe, and in which the wear-shoe is formed with a tool-guiding hole in extension of but of smaller diameter than the recited threaded hole.*

*16. An assembly as defined in claim 12 in which the recited means defining the guideway is formed at opposite sides with a pair of spring-seat shoulders and each wear-shoe is formed at opposite sides with a pair of spring-seat projections respectively overlying and spaced from the said spring-seat shoulders respectively, the assembly including a spring interposed between each spring-seat shoulder and the adjacent spring-seat projection.*

*17. An assembly as defined in claim 16 in which each of the recited springs is of the leaf type and is secured at one of its ends to the guideway-defining means for retention of the spring in place when the wear-shoe is removed.*

*18. An assembly as defined in claim 11 and including a fluid-conducting shaft upon which the recited structure having the recited frictional-engagement surface is secured, a rotary seal surrounding the axis of said shaft for conducting actuating fluid into said shaft, and a second rotary seal surrounding the axis of said shaft for conducting actuating fluid through the other one of the recited structures to the recited cylinder chamber.*

References Cited in the file of this patent or the original patent

UNITED STATES PATENTS

| | | |
|---|---|---|
| 881,510 | Warren et al. | Mar. 10, 1908 |
| 899,953 | Chadwick | Sept. 29, 1908 |
| 1,047,713 | Smith | Dec. 17, 1912 |
| 2,028,152 | Gray | Jan. 21, 1936 |
| 2,060,826 | Roberts | Nov. 17, 1936 |
| 2,229,922 | Heinze | Jan. 28, 1941 |
| 2,304,030 | Schmitter | Dec. 1, 1942 |
| 2,324,979 | Hatch | July 20, 1943 |
| 2,498,123 | Hobbs | Feb. 21, 1950 |
| 2,588,985 | Kutz | Mar. 11, 1952 |
| 2,710,087 | Picard | June 7, 1955 |
| 2,720,866 | Maki | Oct. 18, 1955 |
| 2,823,777 | Banker | Feb. 18, 1958 |

FOREIGN PATENTS

| | | |
|---|---|---|
| 636,240 | France | Jan. 7, 1928 |
| 831,344 | Germany | Feb. 11, 1952 |
| 892,261 | Germany | Oct. 5, 1953 |